US00RE42989E

(19) United States
(12) Reissued Patent
Eadie et al.

(10) Patent Number: US RE42,989 E
(45) Date of Reissued Patent: Dec. 6, 2011

(54) METHOD AND APPARATUS FOR APPLYING LIQUID COMPOSITIONS IN RAIL SYSTEMS

(75) Inventors: Don Eadie, North Vancouver (CA); John Cotter, Vancouver (CA); Dave Elvidge, North Vancouver (CA)

(73) Assignee: Kelsan Technologies Corp., North Vancouver (CA)

(21) Appl. No.: 12/761,223

(22) Filed: Apr. 15, 2010

Related U.S. Patent Documents

Reissue of:
(64) Patent No.: 7,357,427
Issued: Apr. 15, 2008
Appl. No.: 10/875,502
Filed: Jun. 25, 2004

(51) Int. Cl.
*B60B 39/00* (2006.01)
*B61K 3/00* (2006.01)

(52) U.S. Cl. ..... 291/3; 184/3.2

(58) Field of Classification Search ..... 291/1–3, 291/22–24; 701/19; 184/3.1, 3.2
See application file for complete search history.

(56) References Cited

U.S. PATENT DOCUMENTS

| | | | | |
|---|---|---|---|---|
| 2,724,458 | A | 11/1955 | Allard | |
| 4,930,600 | A * | 6/1990 | Kumar et al. | 184/3.2 |
| 5,236,063 | A * | 8/1993 | Nelson et al. | 184/3.2 |
| 5,477,941 | A * | 12/1995 | Kumar et al. | 184/3.2 |
| 5,554,982 | A * | 9/1996 | Shirkey et al. | 340/903 |
| 5,641,037 | A | 6/1997 | Wise et al. | |
| 5,896,947 | A * | 4/1999 | Kumar | 184/3.2 |
| 5,992,568 | A | 11/1999 | Craig et al. | |
| 6,135,767 | A | 10/2000 | Kesling | |
| 6,434,452 | B1 | 8/2002 | Gray | |
| 6,578,669 | B2 * | 6/2003 | Kast et al. | 184/3.2 |
| 6,612,245 | B2 * | 9/2003 | Kumar et al. | 105/26.05 |
| 7,557,748 | B1 * | 7/2009 | Zahm et al. | 342/357.33 |
| 2003/0111295 | A1 | 6/2003 | Kumar et al. | |
| 2007/0272486 | A1 | 11/2007 | Eadie et al. | |

FOREIGN PATENT DOCUMENTS

| | | | |
|---|---|---|---|
| EP | 0 918 677 | B1 | 6/1999 |
| EP | 0918677 | B1 | 1/2000 |
| WO | WO 01/18558 | A1 | 3/2001 |
| WO | WO 02/26919 | A2 | 4/2002 |

OTHER PUBLICATIONS

H. Harrison T. McCanney and J. Cotter (2000), Recent Developments in COF Measurements at the Rail/Wheel Interface, Proceedings The 5th International Conference on Contact Mechanics and Wear of Rail/Wheel Systems CM 2000 (SEIKEN Symposium No. 27), pp. 30-34.

* cited by examiner

*Primary Examiner* — S. Joseph Morano
*Assistant Examiner* — Robert J McCarry, Jr.
(74) *Attorney, Agent, or Firm* — Alan G. Towner, Esq.; Pietragallo Gordon Alfano Bosick & Raspanti, LLP

(57) ABSTRACT

A method for applying a liquid composition to a rail surface is provided. This method involves supplying a liquid composition in one or more reservoirs on a rail car (revenue generating car), and applying the liquid composition from the one or more reservoirs to the rail surface.

15 Claims, 5 Drawing Sheets

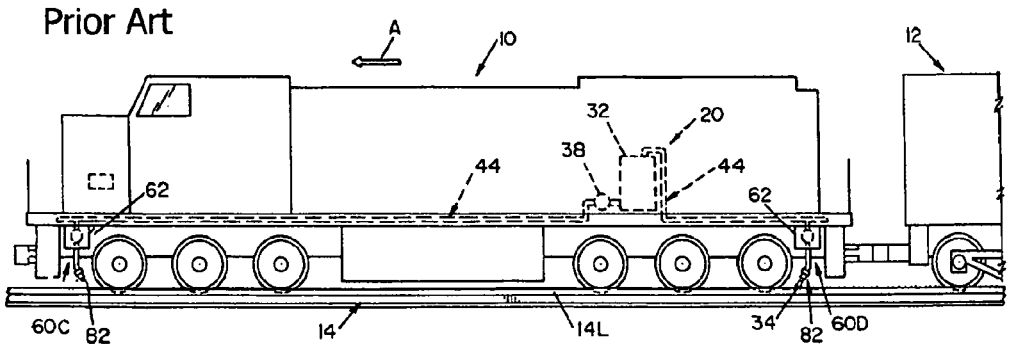
Figure 1, Prior Art
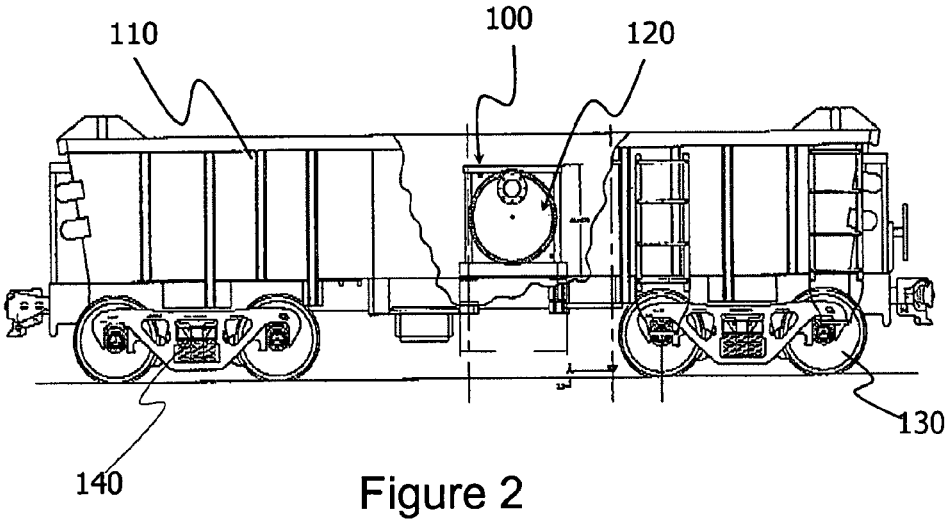
Figure 2
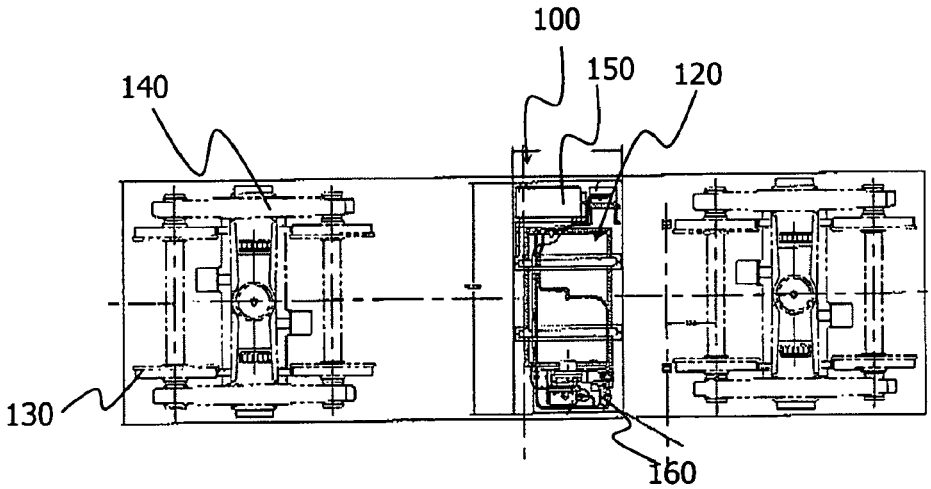
Figure 3

METHOD AND APPARATUS FOR APPLYING LIQUID COMPOSITIONS IN RAIL SYSTEMS

Matter enclosed in heavy brackets [ ] appears in the original patent but forms no part of this reissue specification; matter printed in italics indicates the additions made by reissue.

FIELD OF INVENTION

The present invention relates to liquid composition application systems used in rail systems.

BACKGROUND OF THE INVENTION

The control of friction and wear of metal mechanical components that are in sliding or rolling-sliding contact is of great importance in the design and operation of many machines and mechanical systems. For example, many steel-rail and steel-wheel transportation systems including freight, passenger and mass transit systems suffer from the emission of high noise levels and extensive wear of mechanical components such as wheels, rails and other rail components. The origin of such noise emission, and the wear of mechanical components may be directly attributed to a number of factors: wheel and rail interaction characteristics; operating conditions including curvature, speed; and rail material strength including hardness.

Mechanical friction at the wheel-rail interaction includes: a) friction on both tangent and curved tracks due to rolling friction on the horizontal interface between wheel and rail and b) curve resistance is the additional resistance in curves due to increased lateral friction forces in curves. The sum of the two effects usually accounts for about 5 to 10% of a train's energy consumption in passenger trains and up to 30% very heavy freight trains.

In a dynamic system wherein a wheel rolls on a rail, there is a constantly moving zone of contact. For purposes of discussion and analysis, it is convenient to treat the zone of contact as stationary while the rail and wheel move through the zone of contact. When the wheel moves through the zone of contact in exactly the same direction as the rail, the wheel is in an optimum state of rolling contact over the rail. However, because the wheel and the rail are profiled, often misaligned and subject to motions other than strict rolling, the respective velocities at which the wheel and the rail move through the zone of contact are not always the same on a tangent section of the railway, causing sliding movement between the wheel and the rail. The sliding movement is more pronounced when fixed-axle railcars negotiate curves wherein true rolling contact can only be maintained on both rails if the inner and the outer wheels rotate at different peripheral speeds. This is not possible on fixed-axle railcars. Thus, under such conditions, the wheels undergo a combined rolling and sliding movement relative to the rails. Sliding movement may also arise when traction is lost on inclines thereby causing the driving wheels to slip. In addition, when the when railcars pass through a curvature, the centripetal force will cause additional friction between the flanges of the profiled railcar wheel and the inside side of the 'high rail' of the curvature.

Hence, the requirement for reduction in sliding movement between the railcar wheels and the rail is different between tangent sections and curvature of a railway, between incline and decline of a railway, and a combination thereof.

The magnitude of the sliding movement is roughly dependent on the difference, expressed as a percentage, between the rail and wheel velocities at the point of contact. This percentage difference is termed creepage.

At creepage levels larger than about 1%, appreciable frictional forces are generated due to sliding, and these frictional forces result in noise and wear of components (H. Harrison, T. McCanney and J. Cotter (2000), Recent Developments in COF Measurements at the Rail/Wheel Interface, Proceedings The 5th International Conference on Contact Mechanics and Wear of Rail/Wheel Systems CM 2000 (SEIKEN Symposium No. 27), pp. 30-34, which is incorporated herein by reference). The noise emission is a result of a negative friction characteristic that is present between the wheel and the rail system. A negative friction characteristic is one wherein friction between the wheel and rail generally decreases as the creepage of the system increases in the region where the creep curve is saturated. Theoretically, noise and wear levels on wheel-rail systems may be reduced or eliminated by making the mechanical system very rigid, reducing the frictional forces between moving components to very low levels or by changing the friction characteristic from a negative to a positive one, that is by increasing friction between the rail and wheel in the region where the creep curve is saturated. Unfortunately, it is often impossible to impart greater rigidity to a mechanical system, such as in the case of a wheel and rail systems used by most trains. Alternatively, reducing the frictional forces between the wheel and the rail may greatly hamper adhesion and braking and is not always suitable for rail applications. In many situations, imparting a positive frictional characteristic between the wheel and rail is effective in reducing noise levels and wear of components.

In recent years, significant advancements in lubricant technology have led to the production of special rail lubricants containing friction modifiers that produce "positive friction characteristics" wherein the coefficient of friction increases with the speed of sliding. For example, U.S. Pat. No. 6,135,767 (which is incorporated herein by reference) describes friction modifiers with high or very high positive coefficients of friction; US 2004 0 038 831 A1 (which is incorporated herein by reference) describes a high positive friction control composition with a rheological control agent, a lubricant, a friction modifier, and one, or more than one of a retentivity agent, an antioxidant, a consistency modifier, and a freezing point depressant; and WO 02/26919 (US 2003 0 195 123 A1; which is incorporated herein by reference) describes a liquid friction control composition with enhanced retentivity with an anti-oxidant. The liquid friction control composition may also comprise other components such as a retentivity agent, a rheological control agent, a friction modifier, a lubricant, a wetting agent, a consistency modifier, and a preservative. These friction modifiers are typically solid powders or fine particulates that are suspended in relatively thick fluids. These solid materials enhance friction between a wheel and the rail to promote rolling engagement rather than sliding.

With the development of these new compositions, there is a need for lubricant delivery systems that can accurately and precisely apply such lubricants to the rail. Prior art devices for application of the lubricant or friction modifiers can be classified into two categories: stationary devices on the wayside; and devices mounted on a vehicle.

Stationary devices are usually deployed immediately preceding a location where application is required, the movement of the train tends to move the liquid composition into the area so as to modify the friction on the rail sections and wheel flanges as the train passes. There have been several designs of stationary devices, and apparatus for securing them so as to permit the automatic application of an appropriate composition to the rail when a train passes. In some of these devices, it is the depression of the roadbed that triggers the dispensation of a composition; in others, it is the tripping of a mechanical device, such as a lever or a plunger, by the train's wheels that activates a composition dispensing mechanism. Example of such prior art devices is shown in U.S. Pat. No. 5,641,037. These prior art devices are often mechanically complex and difficult to install and maintain in the field.

Mobile liquid composition delivery devices for lubricating rails, such as the one described in U.S. Pat. No. 5,992,568, may be mounted on a track vehicle, such as a pickup truck (Hi Rail system) equipped with additional flanged wheels.

U.S. Pat. No. 6,578,669 describes a liquid delivery system mounted on a railroad locomotive for applying to a composition to a rail. The system comprises a lubricant path, a reservoir for holding the lubricant, a pump to convey the lubricant along the lubricant path, and a dispensing nozzle mounted to the locomotive above each rail for directing the lubricant onto each rail. However, as drive wheels require good contact with the rail surface, slippage will occur if lubricant is applied in front of any of the drive wheels, and this must be avoided. As locomotives can move in both directions, the delivery system mounted on a locomotive can only be used in an orientation where the active nozzle is behind the driving wheels of the locomotive and this contributes to the complexity of the mechanical systems that already exist on a locomotive. When several locomotives are used in series for pulling heavy freight trains, the nozzle needs to be located behind all driving wheels of the locomotives. The addition or removal of locomotives during use increases the complexity of determining the location of the delivery system within a locomotive consist. Furthermore, a locomotive has limited space for accommodating a liquid reservoir, pump, and delivery systems for applying a liquid composition to a rail system.

Application of liquid compositions within a rail system maybe location dependent, so that a certain liquid compositions may be applied at a certain location of the rail system, applied in different amount at different locations of rail, or different combinations of friction modifiers or friction modifiers and lubricants may be used at different locations of the rail, for example, applied to the top of the rail, or along a side surface of the head of the rail.

Global position system (GPS) has been widely used for locating position on earth. It is well known in the art that navigation systems have been developed, for roadway type vehicles which use a GPS system for determining the approximate location of the vehicle in relation to a street database. By relating the approximate location of the vehicle with information concerning its direction of travel, it is sometimes possible to locate the vehicle on the database

SUMMARY OF THE INVENTION

The present invention relates to liquid composition application systems used in rail systems.

It is an object of the invention to provide a novel method and apparatus for applying liquid compositions in rail systems.

The present invention provides a method (A) for applying a liquid composition to a rail surface comprising, i. supplying the liquid composition in one or more than one reservoir on a rail car; and ii. applying the liquid composition from the one or more than one reservoir to the rail.

Furthermore, after the step of supplying (step i), there may be a step of:

a. determining a change in the topology of the rail within a rail system, and, in the step of applying (step ii), the liquid composition is applied to the rail as a result of a change in the topology of the rail. The rail car may be a freight car or a passenger car.

The present invention pertains to the method (A) as described above, wherein in the step of applying (step ii), the liquid composition is applied to the top of the rail, the side of the rail, or both the top and the side of the rail.

The present invention also provides a liquid composition application system mounted on a rail car comprising:

i. one or more than one reservoir for holding a liquid composition;

ii. a pipe connected to the one or more than one reservoir; and iii. a pump, in fluid communication with the pipe, for moving the liquid composition from the one or more than one reservoir to one or more than one dispensing nozzle.

Furthermore, the liquid composition application system may comprise a controller, or a metering device, for controlling operation of the pump. The controller may be a microprocessor. The controller may be connected to a locomotive control circuit, and respond thereto.

The present invention provides a liquid composition application system as defined above further comprising a source of pressurized air connected to the one or more than one dispensing nozzle to dispense the liquid composition as an atom ized spray.

The present invention also pertains to a rail car, comprising a liquid composition application system, the liquid composition application system comprising:

i. one or more than one reservoir for holding a liquid composition;

ii. a pipe connected to the one or more than one reservoir; and iii. a pump, in fluid communication with the pipe, for moving the liquid composition from the one or more than one reservoir to one or more than one dispensing nozzle.

The present invention provides a method (B) for applying a liquid composition in a railway system comprising:

i. receiving topological information on board a train consist; the train consist having a device for processing the topological information; and ii. applying the liquid composition from one car within the train consist to a rail surface within the rail system according to the topological information.

In the step of receiving (step i), the device may be a computer, a microprocessor, or a programmable logic circuit, furthermore, the one car within the train consist may be a locomotive or a rail car.

The present invention pertains to a method (B) according just defined, wherein in the step of receiving (step i), the device further comprises a global positioning system (GPS), the GPS providing real-time topological information to the device for controlling the application of the liquid composition to the rail surface. The device may further comprises a database having topology information of the railway system, and wherein the device coordinates the information from the GPS with the database information for controlling the application of the liquid composition to the rail surface. Alternatively, in the step of receiving (step i), the device may further comprise a wheel speed monitor for determining differential speed of a pair of wheels located on opposite side of the car within the train consist; where a difference in the wheel speed is used to determine curvature in the rail system, and control the application of the liquid composition to the rail surface. In the step of receiving (step i), the device may also comprise a rail-width detection system, for example a camera-based rail-width detection system.

The present invention also pertains to the method (B) defined above, wherein in the step of receiving (step i), one car in the train consist comprises a gyroscopic device for determining topology information of the railway system; the gyroscopic device providing topological information to the device for controlling the application of the liquid composition to the rail surface.

The present invention provides a device for applying a liquid composition to a rail surface, comprising:

i. means for acquiring topological information in real-time;
ii. means for applying the liquid composition to the rail surface; and
iii. a processing device for receiving the topological information, and controlling the application of the liquid composition.

Preferably, the means for acquiring is selected from the group consisting of a global position system (GPS), a device for determining the speed of a pair of wheels, and a gyroscope.

An advantage of placing the liquid composition application system in a rail car is that the reservoir capacity may be increased from that available in a locomotive, yet space in the rail car is impacted to minimal degree and the carrying capacity of the rail car may still carry an appreciable revenue generating load. Furthermore, by having the application system located in a rail car, locomotives may be added, removed, or their relative position with respect to each other changed without the need to consider the location of the application of the liquid composition to the rail as in most cases it will be behind all of the drive wheels of the locomotive. In the case of a distributed power, when an additional locomotive is placed within the train consist, it is preferred that the rail car comprising the application system is placed behind the additional locomotive. However, placement of the rail car comprising the application system ahead of the additional locomotive is acceptable, provided that there are a sufficient number of axel-passes, for example more than 8 or so axel passes to help dry out the applied composition.

An additional advantage with the liquid composition application system of the present invention is that configuration of the rail system need not be known, yet with the use of a GPS, the inclination or curvature of track may be readily detected and the application of the liquid composition altered accordingly.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 1 shows a prior art liquid composition application system;

FIG. 2 shows a side view of a liquid composition application system mounted in a rail car according to an aspect of the present invention;

FIG. 3 is a top view of the liquid composition application system as illustrated in FIG. 2;

DETAILED DESCRIPTION

Figure 5:
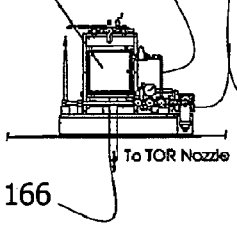
FIG. 5 is a end view of circulation equipment (160) mounted on the side of the reservoir (120) as illustrated in FIG. 4 (viewed from the side of the rail car)

The present invention relates to liquid composition application systems used in rail systems.

The following description is of a preferred embodiment.

In railway industry, especially for the transport of freights, one or more locomotives can be physically connected together, with one locomotive designated as a lead locomotive and the others as trailing locomotives, this is usually called a 'locomotive consist'. A 'train' or a 'train consist' means a combination of revenue generating cars (RGC; also called rail cars), and a locomotive consist. A rail car can be a passenger car or a freight car for example, but not limited to, a flat bed car, a refrigerated car, a bulk materials car for example an ore car, a chemical car, a seed or agricultural materials car, or a box car. Freight cars may unload by tipping. A common characteristic of a rail car is that it is not self-propelled. In contrast, a locomotive, or a mobile liquid composition delivery device such as the one described in U.S. Pat. No. 5,992,968 (a Hi Rail system), are self-propelled.

FIG. 1 shows a prior art composition delivery system (U.S. Pat. No. 6,578,669) mounted on a railroad locomotive for applying a liquid composition to a rail. A single locomotive (10) is attached to rail car (12). A delivery system (20), mounted in locomotive (10) comprises a metering and a dispensing system (60), comprised of individual dispensing assemblies (60C and 60D), a tank (32) for storing a liquid composition, and a delivery path (44) to convey the composition from the tank (32) to the nozzles (34 and 82). Piping system (44) includes a section that extends into the tank (32), and a pump (38) that is operatively disposed within piping section (44). A dispensing conduit extends from housing (62) to a dispensing nozzle (82). Operative components for metering and dispensing the composition are disposed within a watertight housing (62).

The present invention provides a method for applying a liquid composition to a rail surface comprising, supplying the liquid composition in one or more than one reservoir on a rail car (revenue generating car), and applying the liquid composition from the one or more than one reservoir to the rail surface. The liquid composition may be applied to any section of rail, for example, a curved section of rail, a tangent (straight) section of rail, or both a curved and tangent section of rail.

Figure 9:
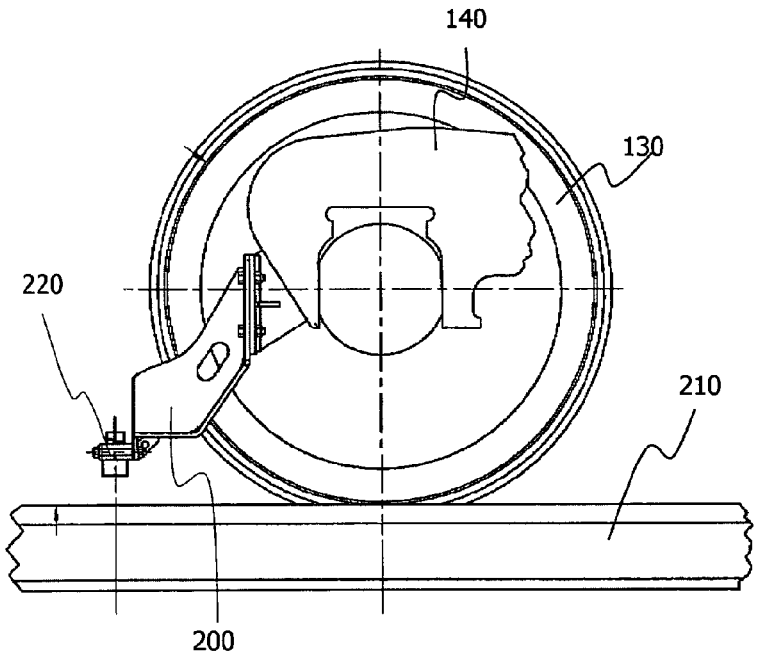
FIG. 9 is a side view of a rail wheel assembly showing a way of attaching a nozzle assembly to the side frame (140)
Figure 10:
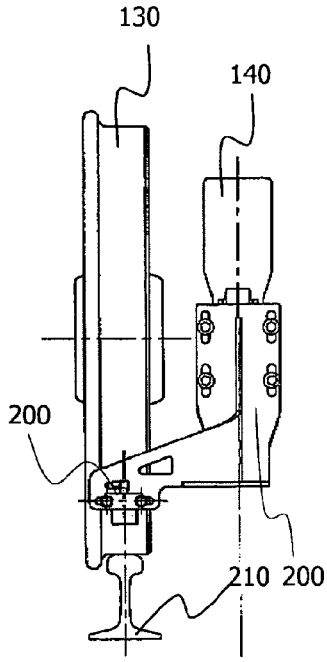
FIG. 10 is a front view of a rail wheel assembly illustrated in FIG. 9.
Figure 11:
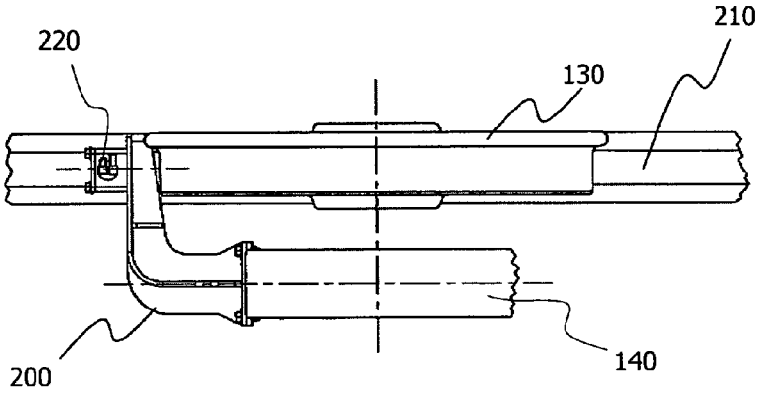
FIG. 11 is a top view of a rail wheel assembly illustrated in FIG. 9.

With reference to FIGS. 2-11, there is shown a liquid composition delivery system (100) as part of a rail car (110), in this example, which is not to be considered limiting, an ore car. The delivery system has a liquid composition reservoir (120) for storing a liquid composition that is to be applied to the rail. This reservoir may comprise one or more than one compartment, depending upon whether one or more than one liquid composition is to be applied to the rail. One or more than one nozzle assembly (220, see FIGS. 9-11) may be attached to the rail car for example at a side frame (140) between the railcar wheels (130; FIGS. 9-11). It is preferred that at least two nozzle assemblies are mounted on a rail car, one assembly on each side of the rail car in order to deliver the composition to one track, or both tracks track of the rail system. Each nozzle assembly may comprise one or more than one nozzle, depending upon whether the top of the rail, the side of the head of the rail (gauge face), or both are to be treated with a composition.

Figure 6:
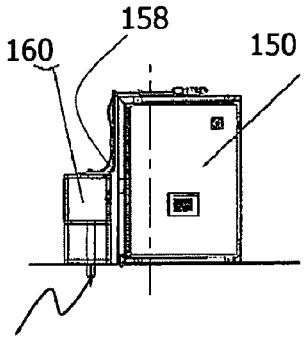
FIG. 6 is a end view of main electrical equipment (150) and circulation equipment (160), mounted on the side of the reservoir as illustrated in FIG. 4 (viewed from the side of the rail car)

The delivery system (100) comprises one or two metering and a dispensing systems (160, FIGS. 3 and 6), a circulation pump (164, FIG. 4) to mix, circulate and refresh the composition through the lines of a pipe system (163) that extend from the reservoir to the metering and dispensing system. The circulation pump also maintains pressure with the pipe system, which is typically a closed loop pipe system, made from any suitable material for example but not limited to a polymeric material, stainless steel, or the like. The circulation pump (164) also conveys the liquid composition from the reservoir (120), through a filter (168), to a supply line (158) entering one or both of the metering and dispensing systems (160). The circulation pump may be fitted with differential pressure switches that can shut off the pump in the event that the filter becomes clogged. Delivery of the composition from the pipe system (163) to the supply line (158) is regulated by one or more than one value, for example a solenoid valve. Each dispensing system includes a metering pump (located within dispensing system 150) that delivers the liquid composition received from the pipe system (163), via a supply line (e.g. 158), to one or more than one nozzle assembly (220; FIGS. 9-11)) via a delivery path (e.g. 166; FIGS. 5, 6 and 9). The dispensing system may also be fitted with solenoid valves and pressure switches to open, close, and regulate the flow of the composition. One metering and dispensing system may be used to supply both of the nozzles on either sides of the rail car, or two dispensing systems (160) may be used as shown in FIGS. 5 and 6, each one independently supplying liquid composition to the nozzle assembly (220).

Electrical components involved in regulating and monitoring delivery of the liquid composition are placed within a protected housing (150), for example at one end of the reservoir (120). The electrical components may include but are not limited to one or more than one microprocessor, programmable logic controller, or computer, that receive information about the rail system during train consist travel, in order to regulate liquid composition delivery to the rail system. Preferably, there is an operator-actuated interface, for example a touch screen. The electrical components of the control system may carry out, but are not limited to the following determinations:

processing changes in topological information in the rail system, for example using a GPS or other rail topological sensing systems as described herein;

controlling the dispensing system as required using information obtained from evaluation of rail topological data, for example but not limited to, orientation of the rail car, speed of the rail car, curve sensing, or changes in elevation, to regulate composition delivery to one or both of the tracks, to the top or gauge-face of the rail, or both;

monitoring pressure, temperature, valve status, pump status and other circulation parameters within the reservoir, pipe system, supply lines, circulation pump, metering pump(s), filter(s), and nozzle assemblies;

controlling the heating system as required within the reservoir, pipe system, supply lines, circulation pump, metering pump(s), filter(s), and nozzel assemblies;

regulating the metering pump output with respect to rail car speed, to ensure a consistent amount of the fluid composition is applied to the railhead;

controlling dispensation of the fluid composition for example if a low tank level switch is activated, shuts down fluid dispensation if high pressure is detected in the dispensing system, switches off the fluid dispensation if a specific drop in brake pipe pressure is determined, or if atomizing air pressure is lost;

shutting of the delivery system below a threshold rail car speed, for example below about 5 to about 10 mph, or more preferably, below about 7 mph;

determining the orientation of the rail car within respect to the train consist. This ensures that the liquid composition is delivered to the nozzle assembly on the desired side of the rail car, for example when applying to curved track; and a combination of the above.

Orientation of the rail car within a train consist may be required if rail cars are rotated within the train consist, for example to equalize wheel wear. Rail car orientation may be determined using any system that can determine if one (e.g. the A) or the other end (B) of the rail car is facing forward within the train consist. Non limiting examples for determining orientation of a rail car include the use of infrared, laser or other light beams and corresponding sensors to determine beam reflection or interruption and using this signal to interpret which end of the rail car, A or B, is facing forward, or the use of electrical circuit monitoring devices, so that when the rail is linked to a power source of a leading car or locomotive, the detection of current indicates which end, the A or B end, is attached to the power source. An example of an electrical current monitoring device includes, but is not limited to, the use of an eddy current device, for example a current transformer (current transducer). One current monitoring device is mounted at the A end, the other at the B end of the rail car. This device generates an electrical signal when linked to the power source of the preceding car or locomotive. As only one end of the rail car is linked to the power source, for example the A end, the resulting signal may be used to determine which end of the rail car is forward.

FIG. 3 is a top view of the delivery system (100) mounted on a freight car. Circulation equipment (160) and electrical equipment (150) may be mounted on one or both sides of the reservoir (120). The system (100), including the reservoir (120), metering and dispensing equipment (160), and control (electrical) system (150), is preferably covered to protect it from payload material as well as debris that can potentially impact on the performance of the equipment. The components of the delivery system (100) may be attached to the frame of the rail car, or attached to the bed of container that is attached to the frame of the car (for example see frame supports 185, FIGS. 4, 7 and 8).

The delivery system of the present invention is also able to withstand tipping of the freight car through an angle of about 165°, for example, when the payload is being discharged from the rail car.

Figure 4:
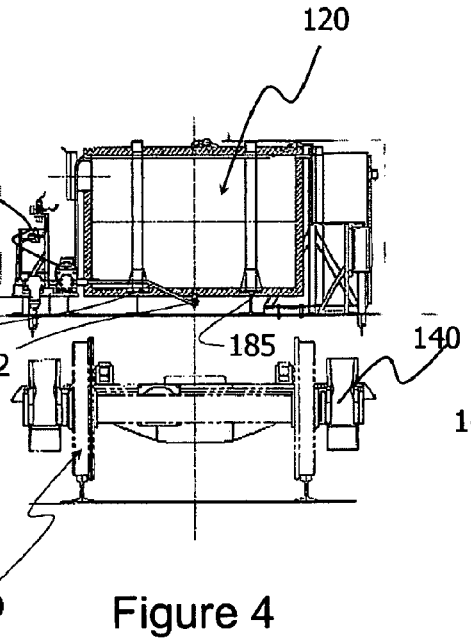
FIG. 4 is a side view of the liquid composition application system as illustrated in FIG. 2 (viewed from the end of the rail car)
Figure 7:
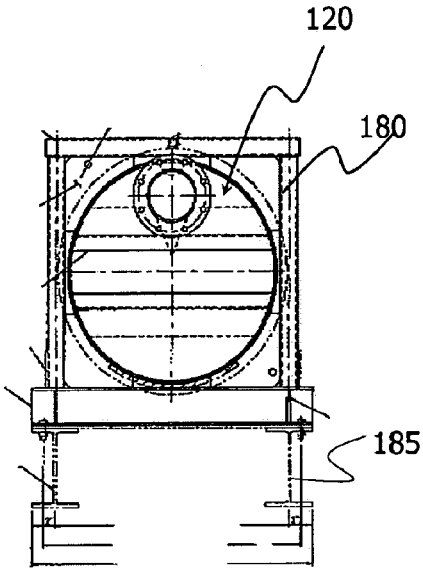
FIG. 7 is an end view of a reservoir of the liquid composition application system as illustrated in FIG. 4 (viewed from the side of the rail car)
Figure 8:
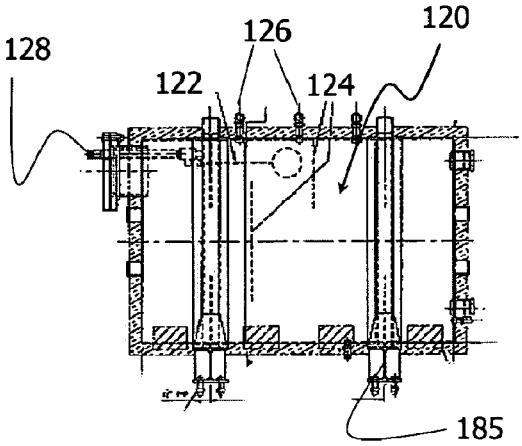
FIG. 8 is a cross sectional view of the reservoir as illustrated in FIG. 4.

A side view of the reservoir (120) is shown in FIG. 4, and end views of the circulation and electrical equipment housing (150, 160, respectively) are shown in FIGS. 5 and 6. The reservoir (120) may have a working capacity of about 50 to about 500 US gallons (about 200 to about 2000 liters), depending upon the space available. Preferable, the volume of the reservoir is from about 100 to about 300 gallons (about 400 to about 1200 liters), more preferably about 200 gallons (about 750 liters). The reservoir is fitted with inlet and outlet ports to allow transfer of fluid from the reservoir to the circulation pump (164) and back as required. The reservoir is also preferably fitted with baffles (124) to reduce movement of the liquid composition within the reservoir, and stiffeners (182). The reservoir is preferably enclosed in a frame (180; FIG. 7) and insulated to retain heat as required. The reservoir (120) may be fitted with a pressure relief valve (126), a vacuum break (128), a liquid volume-indicating device for example a mechanical float valve (122), a series of level switches to monitor fluid level, or both, and a temperature switch.

To maintain an appropriate temperature of the composition within the delivery system when used in cold climates, the reservoir (120) may be outfitted with one or more than one heat blanket, located on the bottom of the reservoir, for example but not limited to silicone rubber heat blankets, and the reservoir may be insulated. Dispensing lines, including the pipe system (163), supply lines (158) delivery lines (166) and nozzle assemblies (220) may also be heat traced and insulated as required. Main electrical enclosures (e.g. 150), and the dispensing and metering system (160) may contain radiant heat sources and they may be insulated to prevent heat loss. The heating system may be controlled by a temperature sensor that activates the heating system when ambient temperature drops below a certain preset temperature.

Referring to FIGS. 9 to 11, a nozzle assembly (220) is mounted to the rail car is any suitable manner that positions the nozzle assembly in a position close to the top of the rail track. For example which is not to be considered limiting, the nozzle assembly (220) may be mounted to a frame (140) via a bracket (e.g. 200). The nozzle assembly may comprise one or more than one nozzle as required. The examples in FIGS. 9-11 show a nozzle assembly comprising one nozzle. However, additional nozzles may be present in the nozzle assembly if the top and the side of the railhead (gauge face of rail) are to receive the same or different liquid composition. A nozzle such as that described in WO 03/099449 (which is incorporated herein by reference) may be used. The distance between nozzle and top of the rail is preferably between about 0.5 and about 5 inches (about 10 to about 80 cm), more preferably, from about 2 to about 4 inches (about 30 to about 60 cm). Adjustable brackets may be used to, for example, compensate for differences in wheel diameters in different rail cars, or due to decrease diameters resulting from wear.

To maintain elevated temperature during use in low temperature environments, the nozzle dispensing enclosures may contain radiant heat sources or cartridge heaters. The dispensing nozzle enclosures may also be insulated to prevent heat loss, for example using a sprayable air cured polyurethane foam or sheet polystyrene. Furthermore, the heating system of the nozzle may be controlled by a temperature sensor that is activated when ambient temperature drops below a certain preset temperature.

The liquid composition is transported from the reservoir (12) to the nozzle assembly (220) by a metering pump housed within one or more than one dispensing and metering system (160). The dispensing system may comprise one or more than one pump, for example a pump for each side of the rail car as shown in FIGS. 5 and 6. Fluid supply to the one or more than one pump can be controlled by an electrically actuated solenoid valve. Pump speed can further be correlated to car speed in order that the same amount of fluid is applied to the railhead.

The application of the liquid composition is preferably in the form of atomized spray by using pressurized air that can be supplied by the locomotive to either end of the rail car, or a compressor on board of the rail car. The air pressure may be for example, which is not to be considered limiting, from about 40 to about 80 psi, and remains constant regardless of car speed. The air pressure may be turned on and off using one or more than one electrically actuated solenoid valve. The liquid can also be applied through a pump without the use of pressurized air. However, it is also to be understood that other methods of applying the liquid composition to the surface of the rail may be used as many sets of non-driving wheels will pass over the film, and the need for film quality and drying time is not a critical variable.

Power for the dispensing equipment can be derived from a locomotive, and provided to the rail car from either end of the car. Alternatively, power can also be generated from a generator located onboard the rail car, or from a generator driven from the wheels of the rail car.

Any liquid composition that can be pumped from the reservoir to a nozzle may be applied using the system of the present invention. Non-limiting examples of liquid compositions that may be applied include those described in U.S. Pat. No. 6,135,767; US 2004 0 038 831 A1; and WO 02/26919 (US 2003 0 195 123 A1; which are incorporated herein by reference).

Therefore, the present invention also provides a liquid composition application system mounted on a rail car comprising:

i. one or more than one reservoir for holding a liquid composition;
ii. a pipe connected to the one or more than one reservoir; and
iii. a pump, in fluid communication with the pipe, for moving the liquid composition from the one or more than one reservoir to one or more than one dispensing nozzle.

Furthermore, the present invention pertains to a rail car, comprising a liquid composition application system, the liquid composition application system comprising:

i. one or more than one reservoir for holding a liquid composition;
ii. a pipe connected to the one or more than one reservoir; and
iii. a pump, in fluid communication with the pipe, for moving the liquid composition from the one or more than one reservoir to one or more than one dispensing nozzle.

Figure 12A:
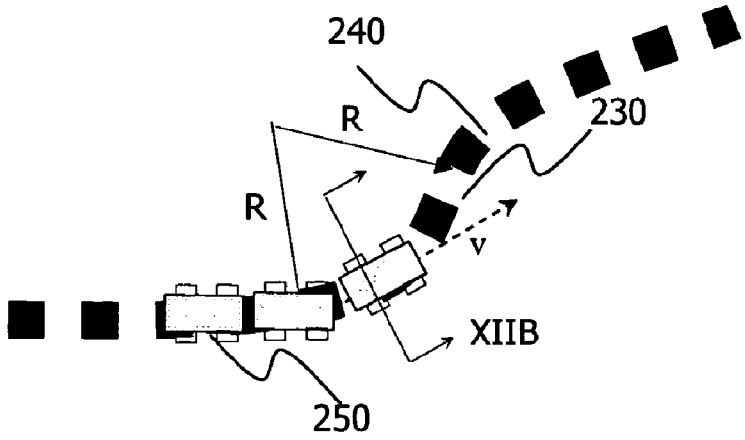
FIG. 12 is a schematic of a train consist passing through a rail with a curvature.

In order to ensure that the liquid composition is applied at the appropriate location along the rail system, for example along curved portions of track, a system is required to detect curves, or changes in elevation. For example, FIG. 12A illustrates a railway track with a curvature. Three railway cars (250) are shown as they are traveling at a translation rate "v" through a curved track (230), which has a radius "R". The track curvature C is the reciprocal of the radius R.

Figure 12B:
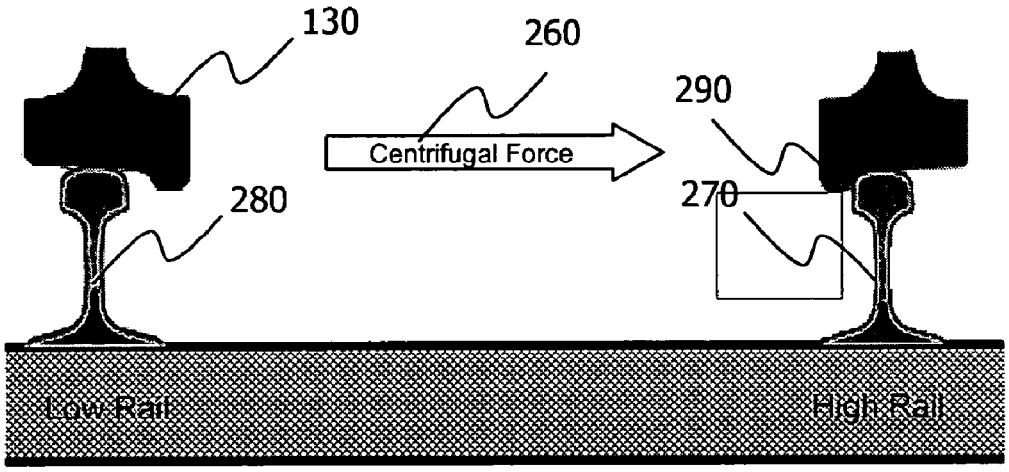

FIG. 12B illustrates a pair of railcar wheels (130) on a track in a left-hand turn curvature. The centrifugal force (260; $C_f$) on a railway car traveling at a speed "v" in a curvature with a radius "R" can be calculated as:

$$C_f=(m\cdot v^2)/R,$$

whereby the "m" is the mass of the railway car. The force will cause the profiled wheel flange to contact the inside surface of the outside rail, or the high rail (270; the inside rail is called low rail, 280). The region of maximum wear is indicated as 290. During the movement through a curvature, a train consist may need different amounts or different types of friction modifier to reduce squeal or increase frictional contact with the surface of the rail. Similarly, when a train consist moves through a rail with inclining or declining segment of tracks, different amounts or different types of friction modifier may also be required.

In order to regulate the amount and rate of application of a liquid composition on the rail, the delivery system of the present invention includes a control system which has a PLC (programmable logic controller), a microprocessor, or a computer, based system and optionally a GPS (global position system) receiver with antenna, or other curve or elevation detection system. The controller may be operatively connected to any rail curve, or rail elevation detection device. However, a GPS system is preferred. The curve or elevation detection system may be located on the rail car, or the locomotive. If located on the locomotive, then the information from the system is operatively linked to the control and delivery system on the rail car.

The control system controls the dispensation if a low tank level switch is activated, and shuts down fluid dispensation if high pressure is detected in the dispensing system. The control system also switches off the fluid dispensation if a specific drop in brake pipe pressure is determined, or if atomizing air pressure is lost. Furthermore, the system will ensure that the fluid composition is not applied to a rail surface below a pre-specified speed, for example the delivery system is shut off below about 5, about 7, or about 10 mph. This avoids application to a rail surface when cars are being shunted in a yard. The control system also maintains a minimum level of fluid in the tank for heating purposes and will shutdown if a low fluid level alarm in the tank is activated. Preferably, the control system has an operator-actuated interface, for example a touch screen.

Figure 13:
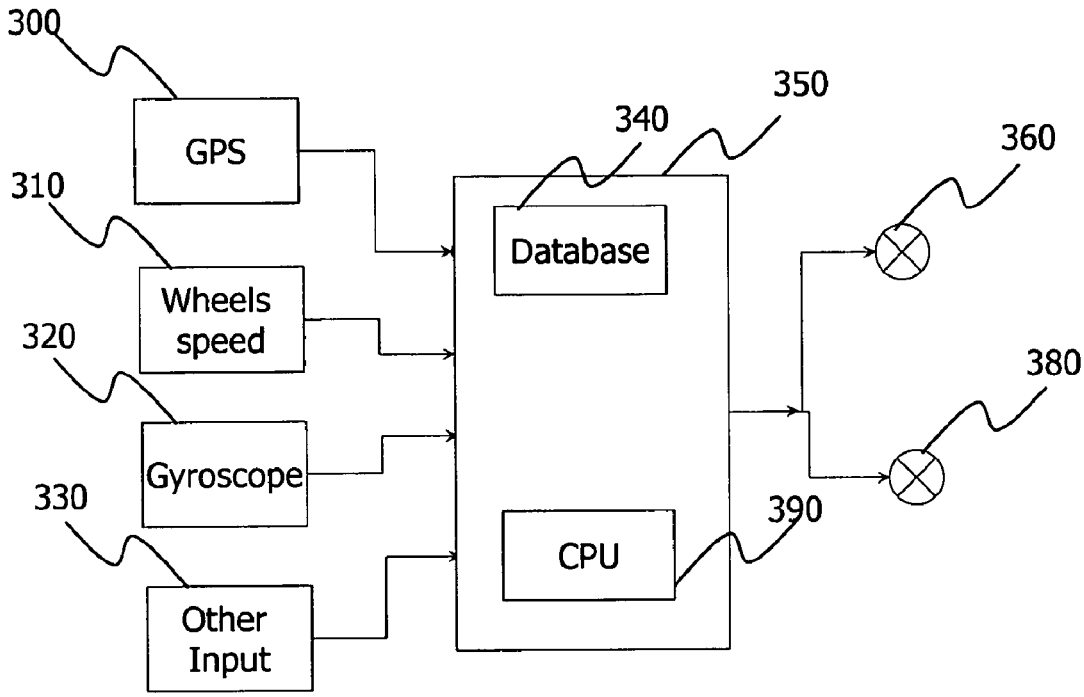
FIG. 13 is a block diagram of an example of a control system for applying a liquid composition

This topology information of a railway may be acquired or stored in different ways. FIG. 13 illustrates a system where the topological information acquired from different sources is used to control the application of liquid composition. One source for acquiring topological information along a rail system is a global positioning system (GPS, 300). In this system, an antenna is mounted at a fixed location, for example at one end, of the rail car. The rail car further comprises a GPS receiver within the electrical equipment (150; FIGS. 3 and 6). The GPS streams data (for example, conforming to NEMA; National Electrical Manufactures Association) to the PLC including latitude, longitude, speed, heading and altitude. The GPS (300) may provide the rail car speed that can be used to control the dispensing pump application rate, or changes in position of the rail car that can be used to determine whether or not the rail car is negotiating a curved portion of track.

The information from the GPS (300) is received by a computer, PLC, or microprocessor (350) which may comprise a database (340) of the topology information about the railway the train consist is traveling, for example, curvature, whether there are changes in elevation of the track. The GPS will provide a location of the train consist along the railway, thereby allowing the computer (350) to control the liquid composition application devices (e.g. 360, 380) independently or together. The GPS system may be located on the rail car, or the locomotive. If located on the locomotive, then the information from the GPS system is operatively linked to the control and delivery system on the rail car.

The GPS may also calculate the topology information in real-time. For example if the direction of the train consist is changing due to a curve then sampling of GPS data can be used to determine the occurrence of a curve in the track, and the rate of application of the liquid composition to the rail adjusted accordingly. In this case, the computer may instruct one or more than one application devices to apply one or more than one liquid compositions to the gauge face of an outside rail (high rail), to the top surface of the inside rail, or both. If the elevation of a train is increasing or decreasing in a given time interval, the train consist may be on an inclining or declining segment of a rail, respectively, and the appropriate dispensation of liquid composition provided to the track.

The information of the topology on a railway can also be obtained from a Geographic Information System (GIS). GIS is a system of computer software, hardware and data, to help manipulate, analyze and present information that is tied to a spatial location, usually a geographic location. The topology information of a railway may also include the incline and decline of the rail. Accordingly, the computer may instruct one or more than one application devices to apply one or more than one liquid compositions to the rail.

Another method of measuring the curvature of a rail is to compare the speed of a pair of wheels on each side of the train (310), if the speed of one wheel is higher than the other, this may indicate a curvature on the railway. In this situation, the computer (350) may instruct for the application of liquid composition for example to the gauge face on side of the rail car exhibiting the increased wheel speed (the high or outside rail), the low rail (traveling at a lower speed), or both.

Alternatively, a rail-width detection system, for example but not limited to a camera-based, or laser-based, rail-width detection system, may be employed that can detect changes in the distance between the rails. As a train consist passes through a curve, the distance between the rails increases due to deflection by the outside rail. Any system that can detect this change in inter-rail distance may be employed.

Another method of measuring the curvature or inclination in a rail system is through the use of one or more than one gyroscope (320). A gyroscope can measure both the yaw rate and the attitude of a train consist. Therefore, the input from a gyroscope can be used to control the liquid composition application devices.

Other devices (330) may also provide information of the curvature or inclination of the track, for example, operator derived information, for example train speed, or manual inputs relating to curvature, and this information may then be used by the computer to control the application rate of the liquid composition as required.

Therefore, the present invention provides a method for applying a liquid composition in a railway system, comprising the steps of:

i. receiving topological information on board a train consist; the train consist having a device for processing the topological information; and ii. applying the liquid composition from one car within the train consist, for example a locomotive or a rail car, to a rail surface within the rail system according to the topological information.

The device may be a computer, PLC or microprocessor, and further comprise a GPS that provides real-time topological information to the device for controlling the application of the liquid composition to the rail surface. A database having topology information of the railway system may also be included within the device, and the device coordinates the information from the GPS with the database information for controlling the application of the liquid composition to the rail surface. Additionally, the device may comprise a wheel speed monitor for determining differential speed of a pair of wheels located on opposite side of a car within the train consist; where a difference in the wheel speed is used to determine curvature in the rail system, and control the application of the liquid composition to the rail surface. A rail-width detection system may also be employed that can detect changes in the distance between the rails due to deflection of the outside rail within a curve. Furthermore, a gyroscopic device may be used to determine topological information of the railway system and provide this information to the device for controlling the application of the liquid composition to the rail surface.

Alternatively, the rail car delivery system of the present invention may also be operatively linked to a control system within a locomotive, where the electrical components, or the controller system, in the rail car receives instructions from a locomotive control circuit. These instructions are then used to regulate the delivery system of the rail car. The locomotive control system may be used to 1) process changes in topological information in the rail system, for example using a GPS or other rail topological sensing systems as described herein; 2) control the dispensing system as required using information obtained from evaluation of rail topological data, for example but not limited to, orientation of the rail car, speed of the rail car, curve sensing, or changes in elevation, to regulate composition delivery to one or both of the tracks, to the top or gauge-face of the rail, or both; 3) monitoring pressure, temperature, valve status, pump status and other circulation parameters within the reservoir, pipe system, supply lines, circulation pump, metering pump(s), filter(s), and nozzle assemblies; 4) controlling the heating system as required within the reservoir, pipe system, supply lines, circulation pump, metering pump(s), filter(s), and nozzle assemblies; 5) regulating the metering pump output with respect to rail car speed, to ensure a consistent amount of the fluid composition is applied to the railhead; 6) controlling dispensation of the fluid composition for example if a low tank level switch is activated, shuts down fluid dispensation if high pressure is detected in the dispensing system, switches off the fluid dispensation if a specific drop in brake pipe pressure is determined, or if atomizing air pressure is lost; 7) shutting of the delivery system below a threshold rail car speed; 8) determining the orientation of the rail car within respect to the train consist; and 9) a combination of the above.

The present invention has been described with regard to one or more embodiments. However, it will be apparent to persons skilled in the art that a number of variations and modifications can be made without departing from the scope of the invention as defined in the claims.

What is claimed is:

1. A liquid composition application system, comprising:

i. a topological device comprising a *single* global position system (GPS) for acquiring topological information of a rail system *based upon sampling of data from the single GPS* in real-time*, the topological information comprising speed, heading, altitude, change in speed, change in direction, change in elevation or orientation of a rail car in the rail system, or a combination thereof*;

ii. an applicator for application of the liquid composition; and iii. a processing device for receiving the topological information, and controlling the application of the liquid composition, wherein control of the application of the liquid composition is based on the topological information received by the processing device.

2. The liquid composition application system of claim 1, wherein the applicator comprises:

i. one or more than one reservoir for holding the liquid composition;

ii. a pipe connected to the one or more than one reservoir;

iii. one or more than one dispensing nozzle; and iv. a pump, in fluid communication with the pipe, for moving the liquid composition from the one or more than one reservoir to the one or more than one dispensing nozzle.

3. The liquid composition application system of claim 2, wherein the processing device comprises a controller for controlling operation of the pump.

4. The liquid composition application system of 3, wherein the controller is selected from the group consisting of a programmable logic controller, a microprocessor and a computer.

5. The liquid composition application system of claim 2, wherein the processing device comprises a metering device for controlling operation of the pump.

6. The liquid composition application system of claim 2, further comprising a source of pressurized air connected to the one or more than one dispensing nozzle to dispense the liquid composition as an atomized spray.

[7. The liquid composition application system of claim 1, wherein the processing device comprises a database having topological information of the rail system and the processing device coordinates the topological information acquired from the GPS with the topological information of the database for controlling the application of the liquid composition.]

8. The liquid composition application system of claim 1, wherein the processing device comprises one or more than one electronic component selected from the group consisting of a microprocessor, a programmable logic controller, a computer, and a combination thereof.

9. The liquid composition application system of claim 8, wherein the one or more than one electronic component has an operator-actuated interface.

10. The liquid composition application system of claim 1, wherein the topological information received by the processing device for controlling the application of the liquid composition is selected from the group consisting of orientation [of a rail car in the rail system], speed [of the rail car], [curve sensing, changes] *change in direction or change* in elevation[, and] *of the rail car, or* a combination thereof.

11. The liquid composition application system of claim 1, wherein the topological information acquired by the GPS and received by the processing device is selected from the group consisting of latitude, longitude, speed, heading, altitude, and a combination thereof.

12. The liquid composition application system of claim 1, wherein the GPS provides the processing device with topological information regarding speed of a rail car in the rail system to control a rate of application of the liquid composition.

13. The liquid composition application system of claim 1, wherein the GPS provides the processing device with topological information regarding changes in position of a rail car in the rail system to determine whether or not the rail car is negotiating a curved portion of a rail track in the rail system and the processing device controls application of the liquid composition accordingly.

14. The liquid composition application system of claim 1, wherein the GPS provides the processing device with topological information regarding changes in elevation of a rail car in the rail system to determine whether or not the rail car is negotiating an inclining or declining segment of a rail track in the rail system and the processing device controls application of the liquid composition accordingly.

15. A method of applying a liquid composition in a rail system using the liquid composition application system of claim 1.

16. A method of applying a liquid composition in a rail system comprising:

i. providing the liquid composition application system of claim 1;

ii. acquiring topological information of the rail system in real-time using the GPS;

iii. processing the topological information and controlling application of the liquid composition using the processing device, wherein control of the application of the liquid composition is based on the topological information received by the processing device.

* * * * *